US011336158B2

(12) United States Patent
Kinpara et al.

(10) Patent No.: US 11,336,158 B2
(45) Date of Patent: May 17, 2022

(54) MANUFACTURING METHOD OF CORE OF ROTATING ELECTRICAL MACHINE, AND CORE OF ROTATING ELECTRICAL MACHINE

(71) Applicant: TOYOTA JIDOSHA KABUSHIKI KAISHA, Toyota (JP)

(72) Inventors: Hiroshi Kinpara, Toyota (JP); Takashi Takahashi, Toyota (JP); Tomohiro Segawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 701 days.

(21) Appl. No.: 16/116,139

(22) Filed: Aug. 29, 2018

(65) Prior Publication Data
US 2019/0115810 A1 Apr. 18, 2019

(30) Foreign Application Priority Data

Oct. 18, 2017 (JP) .............................. JP2017-201940

(51) Int. Cl.
*H02K 15/02* (2006.01)
*H02K 15/03* (2006.01)
(Continued)

(52) U.S. Cl.
CPC ............. *H02K 15/02* (2013.01); *B21D 28/02* (2013.01); *H02K 1/148* (2013.01); *H02K 1/2786* (2013.01);
(Continued)

(58) Field of Classification Search
CPC ........ H02K 1/148; H02K 1/20; H02K 1/2706; H02K 1/2766; H02K 1/32; H02K 15/02; H02K 15/022; H02K 15/03; B21D 28/02; B21D 28/04; B21D 28/10; B21D 28/12; B21D 28/22; B21D 39/03; B21D 39/034;
(Continued)

(56) References Cited

U.S. PATENT DOCUMENTS 4,383,356 A * 5/1983 Fichtner ................ H02K 15/02
219/137 R
4,445,272 A 5/1984 Bruhn et al.
(Continued)

FOREIGN PATENT DOCUMENTS

JP 2-118445 U 9/1990
JP 5-103448 A 4/1993
(Continued)

OTHER PUBLICATIONS

Partial Translation of Notification of Reason(s) for Refusal dated Oct. 20, 2020, issued by the Japanese Patent Office in application No. 2017-201940.

*Primary Examiner* — Peter Dungba Vo
*Assistant Examiner* — Joshua D Anderson
(74) *Attorney, Agent, or Firm* — Sughrue Mion, PLLC

(57) ABSTRACT

A manufacturing method of a core of a rotating electrical machine includes: a preparation step of preparing a press device; a fixing step of fixing a steel sheet to a shaft member held by the press device by passing the shaft member through a hole provided in the steel sheet and extending in a stacking direction; and a processing step of performing press-working on the steel sheet by the press device in a state where the steel sheet is fixed to the shaft member.

8 Claims, 22 Drawing Sheets

(51) Int. Cl.
*B21D 28/02* (2006.01)
*H02K 1/14* (2006.01)
*H02K 1/2786* (2022.01)
*H02K 5/04* (2006.01)
*H02K 1/32* (2006.01)
*H02K 1/276* (2022.01)

(52) U.S. Cl.
CPC ............... *H02K 5/04* (2013.01); *H02K 15/03* (2013.01); *H02K 1/2766* (2013.01); *H02K 1/32* (2013.01); *Y10T 29/49009* (2015.01)

(58) Field of Classification Search
CPC ......... Y10T 29/49009; Y10T 29/49012; Y10T 29/49078; Y10T 29/53143; Y10T 29/53161; Y10T 29/5142; Y10T 29/5317
See application file for complete search history.

(56) References Cited

U.S. PATENT DOCUMENTS

| | | |
|---|---|---|
| 5,255,425 A | 10/1993 | Kanno |
| 2005/0050714 A1 | 3/2005 | Hashimoto et al. |
| 2006/0279160 A1 | 12/2006 | Yoshinaga et al. |
| 2012/0286595 A1* | 11/2012 | Pal ........................ H02K 9/197 310/54 |
| 2014/0041207 A1 | 2/2014 | Matsushita et al. |
| 2016/0329784 A1 | 11/2016 | Tamura et al. |
| 2017/0326607 A1* | 11/2017 | Tsukamoto ........... B21C 47/247 |

FOREIGN PATENT DOCUMENTS

| | | |
|---|---|---|
| JP | 5-103449 A | 4/1993 |
| JP | 06-165447 A | 6/1994 |
| JP | 2005-103638 A | 4/2005 |
| JP | 2007-20386 A | 1/2007 |
| JP | 2007-215323 A | 8/2007 |
| JP | 2008199831 A | 8/2008 |
| JP | 2015-91150 A | 5/2015 |
| JP | 2016-226109 A | 12/2016 |
| KR | 10-2004-0074734 A | 8/2004 |
| WO | 2012/144059 A1 | 10/2012 |
| WO | 2015/125254 A1 | 8/2015 |

\* cited by examiner

PRIOR ART

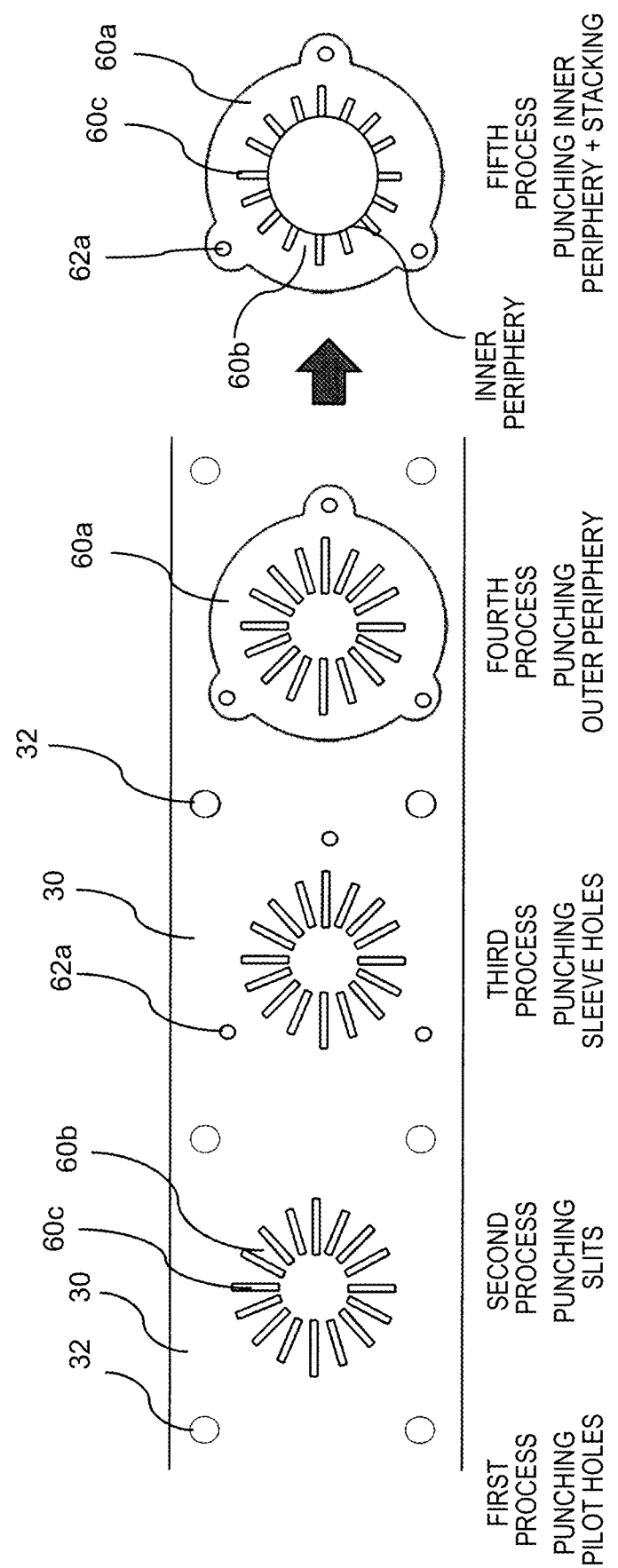

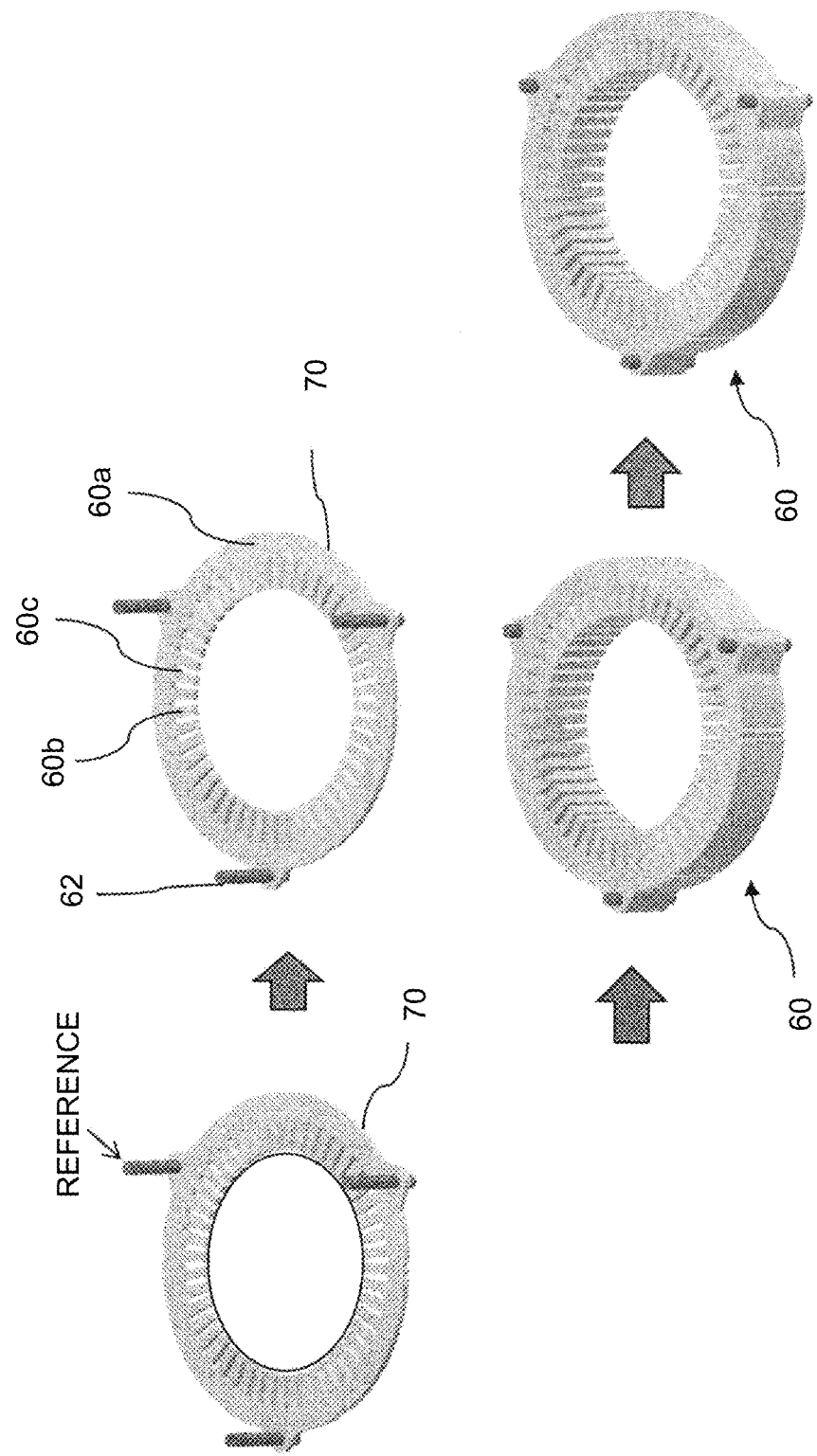

MANUFACTURING METHOD OF CORE OF ROTATING ELECTRICAL MACHINE, AND CORE OF ROTATING ELECTRICAL MACHINE

INCORPORATION BY REFERENCE

The disclosure of Japanese Patent Application No. 2017-201940 filed on Oct. 18, 2017 including the specification, drawings and abstract is incorporated herein by reference in its entirety.

BACKGROUND

1. Technical Field

The present disclosure relates to a manufacturing method of a core of a rotating electrical machine, such as a rotor core or a stator core, and to a core of a rotating electrical machine.

2. Description of Related Art

A rotating electrical machine, such as a motor generator, has a rotor and a stator, with the rotor rotating relative to the stator. For example, a permanent magnet is disposed in the rotor and a coil is provided in the stator, and the rotor is rotated by a rotating magnetic field generated by the stator coil. For this purpose, the rotor is formed by inserting a permanent magnet into a magnet insertion hole of a rotor core, and the stator is formed by winding a coil around teeth of a stator core.

Here, in most cases, a core of a rotating electrical machine, such as a rotor core or a stator core, is formed by stacking magnetic steel sheets. In this case, it is necessary to first process the magnetic steel sheet into a predetermined shape, which is achieved, for example, by punching using a press machine. In Japanese Patent Application Publication No. 2016-226109, pilot holes are formed at predetermined positions in a long band-shaped coiled material (band-shaped steel sheet), and a press machine is positioned by inserting pilot pins of the press machine into these pilot holes. Then, press-working is performed to form a magnetic steel sheet that forms a rotor core or a stator core. For example, a magnetic steel sheet for a rotor core is formed in a circular outer shape, with magnet insertion holes, oil path holes, etc. punched on the inside, while a magnetic steel sheet for a stator core is formed in a circular outer shape, with teeth punched on the inner side.

SUMMARY

In the press-working of a magnetic steel sheet, pilot pins are inserted into pilot holes provided in the material of the magnetic steel sheet, and punching is performed using the pilot pins as reference for positioning, and then the pilot pins are removed. To allow each pilot pin to be easily extracted from and inserted into the pilot hole, a clearance is left between the pilot hole and the pilot pin. A positional shift occurs as the material becomes elongated by being pressed, or as the material meanders while being conveyed in the case of progressive press-working.

Thus, when a magnetic steel sheet is processed using the pilot pins inserted in the pilot holes as processing reference, the processing accuracy degrades according to the positional shift. It is therefore desired to improve the positioning accuracy.

In particular, a rotating electrical machine has a clearance between the rotor and the stator. To generate a high torque by transmitting a magnetic flux without any waste, it is essential to make this clearance (hereinafter referred to as an air gap) as small as possible, which requires improving the processing accuracy.

A first aspect of the present disclosure is a manufacturing method of a core of a rotating electrical machine. The core of the rotating electrical machine includes a stack of steel sheets and is included in the rotating electrical machine including a shaft member. The shaft member is fixed to the stack of the steel sheets and extends in a stacking direction of the steel sheets. The manufacturing method includes: a preparation step of preparing a press device; a fixing step of fixing the steel sheet to the shaft member held by the press device, by passing the shaft member through a hole provided in the steel sheet and extending in the stacking direction; and a processing step of performing press-working on the steel sheet by the press device in a state where the steel sheet is fixed to the shaft member.

This configuration can improve the processing accuracy of steel sheets. As the accuracy of the outer periphery of the rotor core and the inner periphery of the stator core is improved, the air gap can be made smaller and the performance of the rotating electrical machine can be thereby enhanced.

The manufacturing method of the core of the rotating electrical machine may further include a cutting step of cutting off the steel sheet fixed to the shaft member from a band-shaped steel sheet. The preparation step may be a step of preparing the press device that sequentially performs press-working on, while conveying, the band-shaped steel sheet by a plurality of press machines arrayed in a longitudinal direction of the band-shaped steel sheet. The fixing step may be a step of fixing the shaft member and the steel sheet to each other by press-fitting the shaft member held by a press machine for a final process in the press device into a hole provided in the steel sheet and extending in the stacking direction. The cutting step may be performed by press-working in the final process.

In the manufacturing method of the core of the rotating electrical machine, the fixing step may include a step of fixing a first steel sheet to the shaft member by passing the shaft member through a hole provided in the first steel sheet and extending in the stacking direction, and a step of stacking a second steel sheet on the first steel sheet and fixing the second steel sheet to the shaft member to which the first steel sheet is fixed, by passing the shaft member through a hole provided in the second steel sheet and extending in the stacking direction. The first steel sheet and the second steel sheet may be included among the steel sheets. The processing step may include a step of performing press-working on the first steel sheet by the press device in a state where the first steel sheet is fixed to the shaft member, and a step of performing press-working on the second steel sheet by the press device in a state where the second steel sheet is fixed to the shaft member.

In the manufacturing method of the core of the rotating electrical machine, the first steel sheet and the second steel sheet may be stacked without being fixed to each other.

In the manufacturing method of the core of the rotating electrical machine, press-working on the steel sheet may be press-working for a rotor core.

In the manufacturing method of the core of the rotating electrical machine, the processing step may include processing an outer periphery of the steel sheet.

In the manufacturing method of the core of the rotating electrical machine, the shaft member may be a rotor shaft.

In the manufacturing method of the core of the rotating electrical machine, press-working on the steel sheet may be press-working for a stator core.

In the manufacturing method of the core of the rotating electrical machine, the processing step may include processing an inner periphery of the steel sheet.

In the manufacturing method of the core of the rotating electrical machine, the shaft member may be a sleeve.

A second aspect of the present disclosure is a core of a rotating electrical machine. The core of the rotating electrical machine includes a plurality of stacked steel sheets. The steel sheets have a hole extending in an axial direction. The steel sheets are fixed to a shaft member in a state where the shaft member is press-fitted in the hole extending in the axial direction. The steel sheets are stacked without being fixed to one another.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 13 is a view illustrating a manufacturing process of the stator core in the second embodiment;

FIG. 14 is a view illustrating a process of punching an inner periphery and stacking of the stator core in FIG. 13;

DETAILED DESCRIPTION OF EMBODIMENTS

Embodiments of the present disclosure will be described below based on the drawings. The present disclosure is not limited to the embodiments described herein.

In a first embodiment, a rotor core is adopted as a core of a rotating electrical machine, and steel sheets, for example, magnetic steel sheets are processed and stacked to form the rotor core as a stack.

Figure 1:
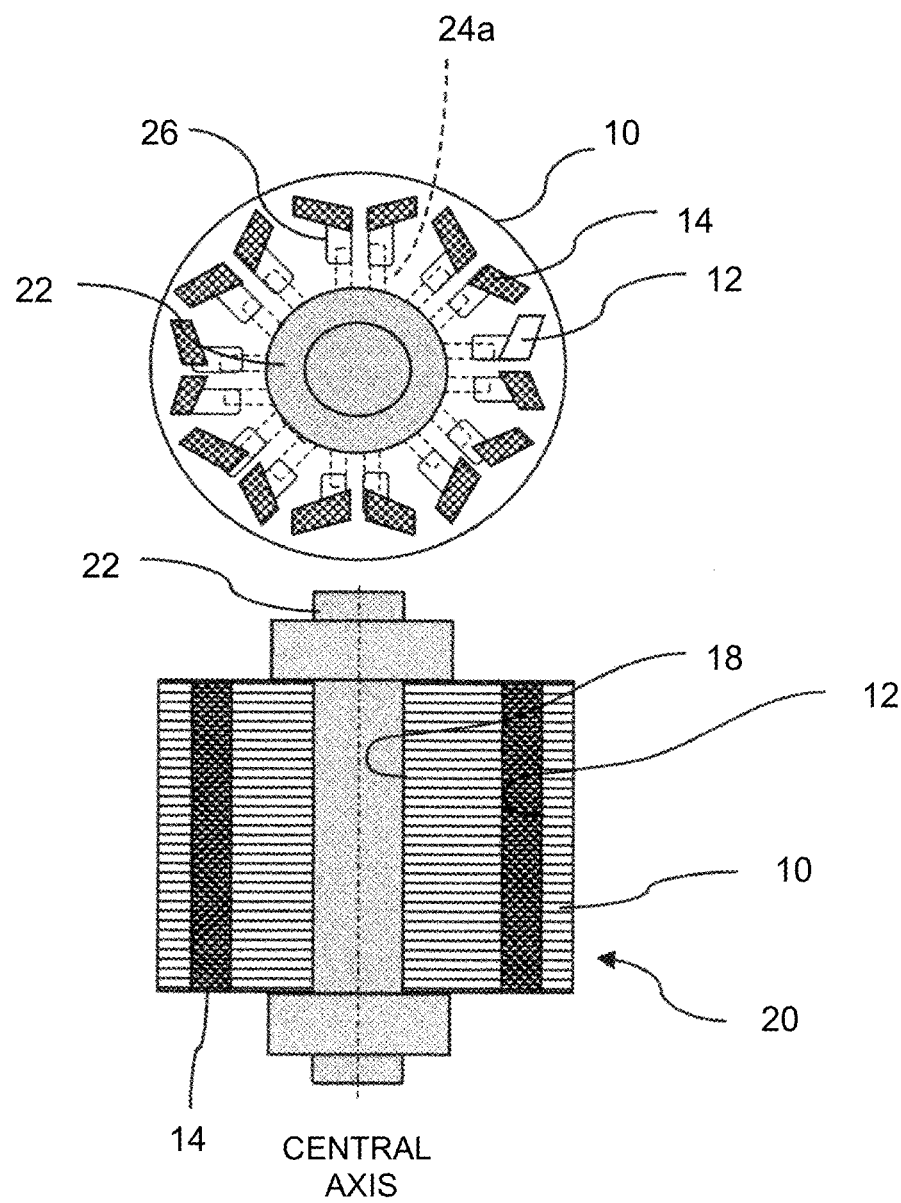
FIG. 1 is a plan view and an elevation view showing a rotor of a rotating electrical machine in a first embodiment of the present disclosure.

FIG. 1 is a schematic view showing the configuration of a rotor according to this embodiment. As shown in the upper drawing (plan view), magnetic steel sheets 10 adopted as the steel sheets have a circular shape as a whole, with a plurality of (in this example, 16) magnet holes 12 provided in a peripheral part at regular intervals in a circumferential direction. Magnets 14 are inserted in the magnet holes 12. FIG. 1 shows a state where one of the magnet holes 12 does not have the magnet 14 inserted therein while the other magnet holes 12 have the magnet 14 inserted therein.

As shown in the lower drawing (elevation view), a rotor core 20 is formed by stacking a plurality of magnetic steel sheets 10. A shaft hole 18 is formed at a central part of the rotor core 20, and a rotating shaft (rotor shaft) 22 as a shaft member is inserted in the shaft hole 18. The positions of the stacked magnetic steel sheets 10 coincide with one another, and the magnet holes 12 extending in an axial direction are formed by the stacked magnetic steel sheets 10. The magnets 14 are inserted into the magnet holes 12. In reality, end plates are disposed respectively at both ends of the rotor core 20 in the axial direction, and both ends of the magnets 14 in the axial direction are supported by the end plates. In reality, therefore, the magnet holes 12 and the magnets 14 are invisible in a plan view. Oil paths are not shown in the lower drawing.

Figure 2:
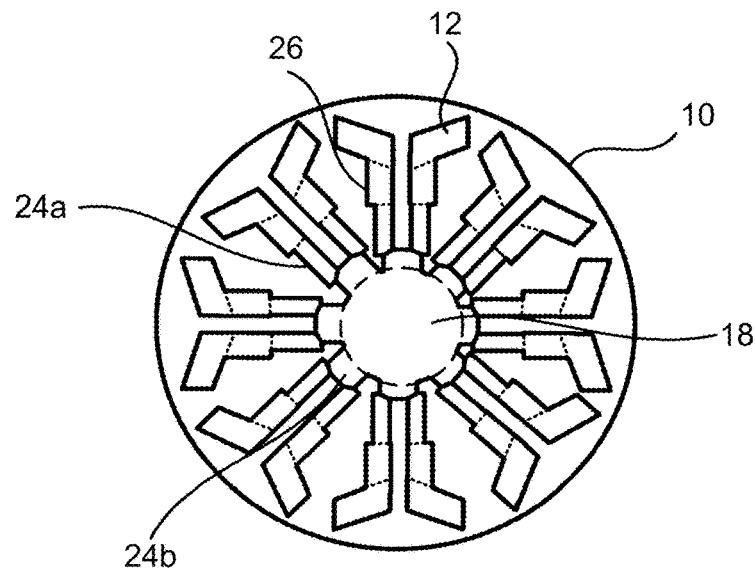
FIG. 2 is a plan view showing one magnetic steel sheet in FIG. 1.
Figure 3:
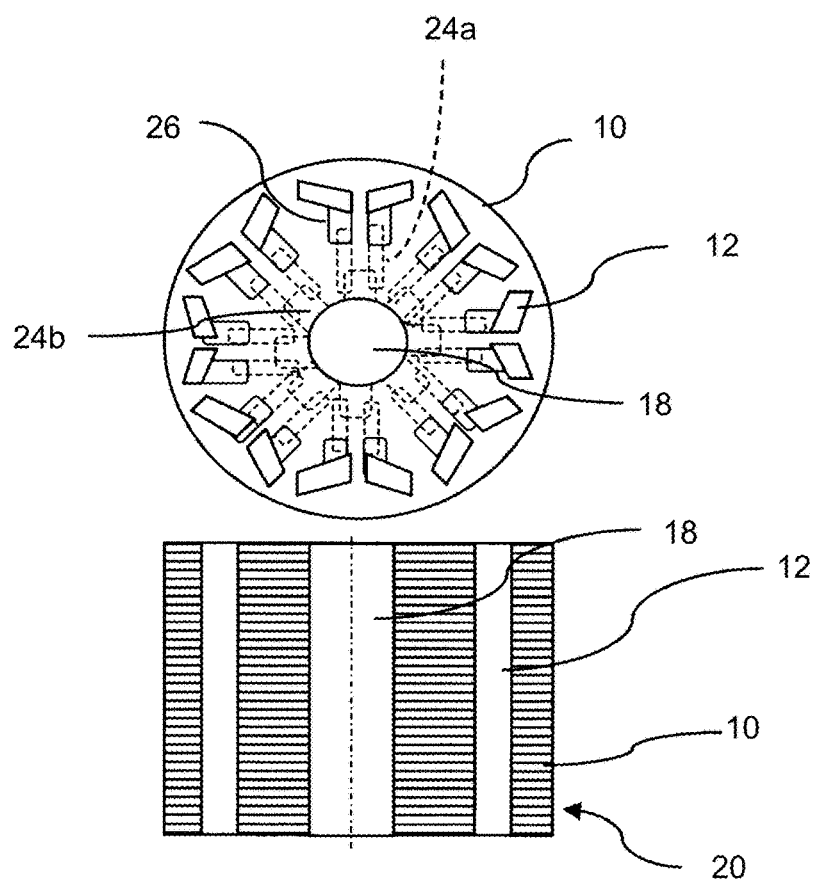
FIG. 3 is a plan view and an elevation view showing a stacked rotor core in FIG. 1.

A central oil path (not shown) is formed at the center of the rotating shaft 22, and radial oil paths are formed at predetermined positions and open in an outer periphery of the rotating shaft 22. As indicated by the dashed lines in the upper drawing, radial oil paths 24 extend outward from the center so as to correspond to openings in the rotating shaft 22. One or more radial oil paths 24 are provided near the center in the axial direction, and are each connected to an axial oil path 26 at a position of roughly half the radius of the rotor core 20. The axial oil paths 26 are also formed in the end plates, and thus oil (cooling medium) supplied to the central oil path flows out from the ends of the rotor core 20 in the axial direction through the radial oil paths 24 and the axial oil paths 26. In FIG. 2 and FIG. 3, these oil paths are shown in more detail; each radial oil path 24 has one radial oil path 24*b* on the center side and two radial oil paths 24*a* branching from the radial oil path 24*b*, and the radial oil paths 24*a* are connected to the corresponding axial oil paths 26.

Thus, each magnetic steel sheet 10 is provided with an opening of the shaft hole 18 at the center, openings of the magnet holes 12 in the peripheral part, openings of the axial oil paths 26 in an intermediate part, and openings of the radial oil paths 24 on the inner side. The openings of the axial oil paths 26 are normally provided in all the magnetic steel sheets 10, while the radial oil paths 24 are provided in only those magnetic steel sheets 10 that are required to form the oil paths.

FIG. 2 shows one magnetic steel sheet 10. This magnetic steel sheet 10 is provided with the shaft hole 18, the magnet holes 12, the radial oil paths 24*a*, 24*b*, and the axial oil paths 26. In FIG. 2, each border between the oil paths are indicated by the thin lines, but in reality these oil paths communicate with each other. The opening of the shaft hole 18 is indicated by the dashed line.

In FIG. 3, the rotor core 20 that is a stack of the magnetic steel sheets 10 is shown, with the rotating shaft of FIG. 1 omitted. In the lower drawing, the shaft hole 18 and the magnet holes 12 are shown, with the oil paths omitted. As shown in the upper drawing, the radial oil paths 24 extend from the shaft hole 18.

Figure 4:
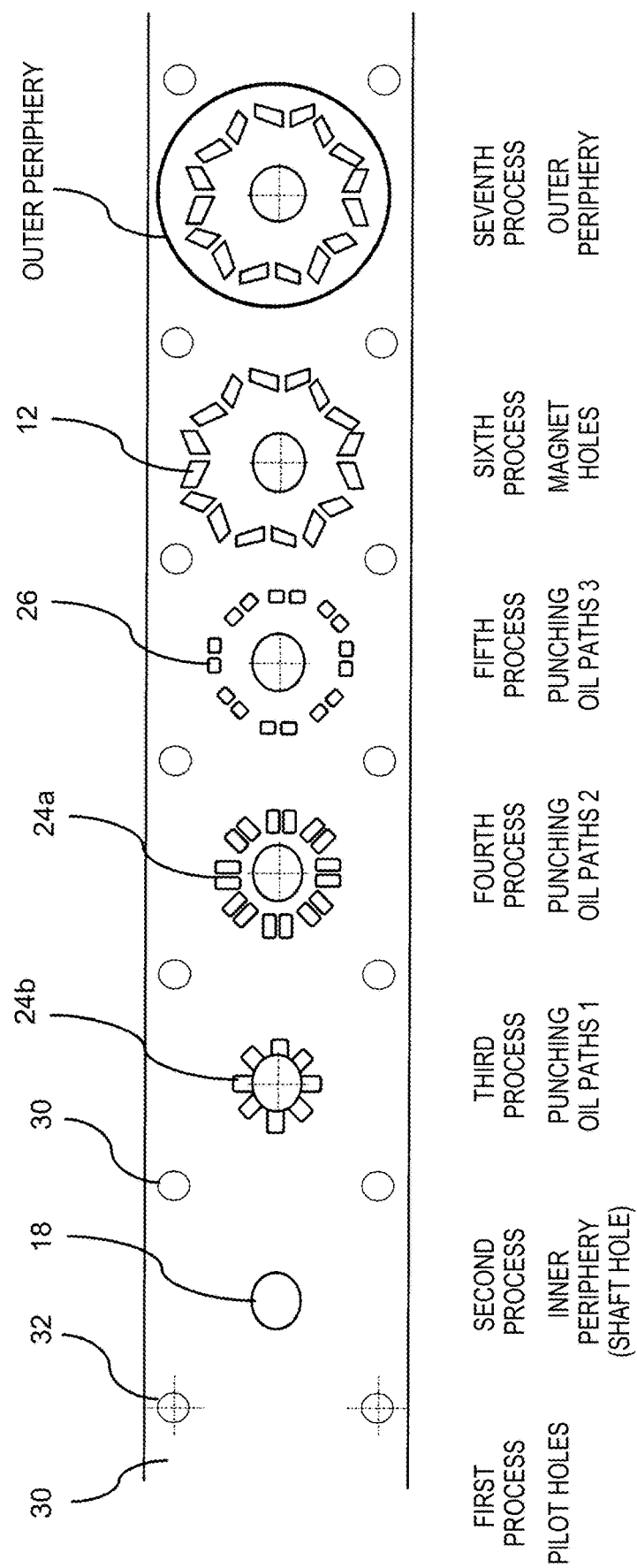
FIG. 4 is a view illustrating processes of punching the magnetic steel sheet in the first embodiment, with a seventh process showing a conventional punching process.

FIG. 4 schematically shows the procedure of press-working of the magnetic steel sheet 10. To produce the magnetic steel sheet 10 by press-working, a long sheet-shaped, band-shaped material (band-shaped steel sheet) 30 for that purpose is prepared. A press device in this example is a progressive press device that sequentially performs press-working by a plurality of press machines arrayed in a longitudinal direction. The material (band-shaped steel sheet) 30 wound in a coil shape is punched multiple times, while being reeled out and conveyed, to form the magnetic steel sheet 10. In FIG. 4, the multiple punching processes in forming one magnetic steel sheet 10 are schematically shown with basically only the portions punched in each process and the shaft hole 18. Finally, the magnetic steel sheet 10 shown in FIG. 2 including all the punched portions is obtained. Punching is performed in a final process.

In a first process, pilot holes 32 are punched in the material 30. The pilot holes 32 serve as reference for forming the shaft hole 18 next, and are formed outside a region where the magnetic steel sheet 10 is to be formed. In this embodiment, it is not absolutely necessary to provide the pilot holes 32.

In a second process, the shaft hole 18 defining the inside diameter of the magnetic steel sheet 10 is punched using the pilot holes 32 as reference. The shaft hole 18 is formed roughly at the center of the material 30 in a width direction and a predetermined distance away from an area where the adjacent magnetic steel sheet 10 is to be formed.

In a third process, the holes of the radial oil paths 24*b* on the inner side are formed, and in a fourth process, the holes of the radial oil paths 24*a* on the outer side are formed. In a fifth process, the holes of the axial oil paths 26 are formed.

In a sixth process, the magnet holes 12 are formed, and in a seventh process, a radially outer part of the magnetic steel sheet 10 is punched. In the second process to the sixth process, only the shaft hole 18 and the portions punched in each process are shown, and in the seventh process, the radially outer part punched in this process, and the shaft hole 18 and the magnet holes 12 are shown.

In reality, in the seventh process, the radially outer part of the sheet having the openings punched in the processes up to the sixth process is punched to obtain the doughnut-shaped magnetic steel sheet 10.

Here, in conventional practice, punching in the second to seventh processes is performed using the pilot holes 32 as reference. In this embodiment, by contrast, this processing is performed using the center of the shaft hole 18 as reference. In particular, processing of the magnetic steel sheet 10, at least the seventh process, is performed in a state where the rotating shaft 22 is inserted in the shaft hole 18.

Figure 5:
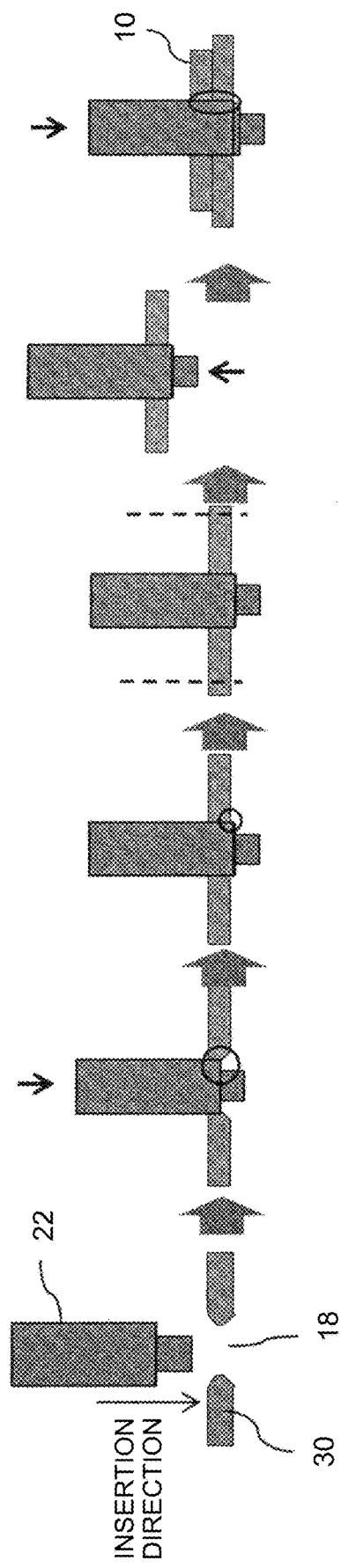
FIG. 5 is a view illustrating a process of press-fitting a shaft member of the rotor in the first embodiment.

FIG. 5 shows details of the seventh process in the press-working of this embodiment. In this example, it is assumed that punching is performed using the pilot holes 32 as reference up to the sixth process. Then, in the seventh process, an outer periphery of the magnetic steel sheet 10 forming the rotor core 20 is processed using the center of the rotating shaft 22 as reference.

First, the material 30 is fed, and in this state, the rotating shaft 22 is moved downward toward the shaft hole 18 that is a hole extending in a stacking direction of the magnetic steel sheets 10. Then, the rotating shaft 22 is inserted into the shaft hole 18. The minimum inside diameter of the shaft hole 18 is smaller than the outside diameter of the rotating shaft, so that the rotating shaft 22 is press-fitted and fixed in the shaft hole 18. As the rotating shaft 22 is moved downward to a predetermined position, press-fitting of the rotating shaft 22 into the shaft hole 18 is completed.

In this state, the outer periphery of the magnetic steel sheet 10 fixed to the rotating shaft 22 is punched using the center of the rotating shaft 22 as reference. As a result, the doughnut-shaped (annular) magnetic steel sheet 10 is obtained from the sheet-shaped material 30.

Next, the rotating shaft 22 and the magnetic steel sheet 10 with the outer periphery punched are moved upward in a state where the magnetic steel sheet 10 is fixed to the rotating shaft 22. In this state, the next material 30 is moved to below the rotating shaft 22 with the magnetic steel sheet 10 fixed thereto, and the rotating shaft 22 is moved downward and inserted and press-fitted into the shaft hole 18 of the material 30. At this point, the position of the rotating shaft 22 relative to the new material 30 is the same position as last time. Thus, the magnetic steel sheet 10 press-fitted last time is moved upward in an amount corresponding to the thickness thereof, and the material 30 of this time is positioned below the magnetic steel sheet 10. In this state, the outer periphery is punched and the magnetic steel sheet 10 is cut off from the material 30. As this processing is repeated, a required number of magnetic steel sheets 10 are stacked and the rotor core 20 is formed around the rotating shaft 22.

Figure 6:
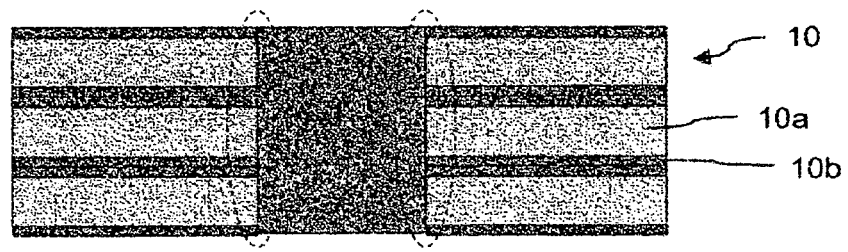
FIG. 6 is a schematic view showing the stacked magnetic steel sheets in the first embodiment.

FIG. 6 shows a state where the magnetic steel sheets 10 are stacked as described above. The magnetic steel sheet 10 is composed of a sheet-shaped steel material 10a and an insulation film 10b formed on each side of the steel material 10a, and the stacked magnetic steel sheets 10 are insulated from one another and a vortex magnetic flux is formed in the axial direction.

In particular, in the manufacturing method of this embodiment, the outer periphery of the magnetic steel sheet 10 is punched, with the magnetic steel sheet 10 press-fitted on the rotating shaft 22 and thereby fixed to the rotating shaft 22. Thus, this manufacturing method does not involve a process of connecting the stacked magnetic steel sheets 10 to each other, and the magnetic steel sheets 10 stacked in the process of punching the outer periphery are pressed so as to be stacked without clearance.

Figure 7:
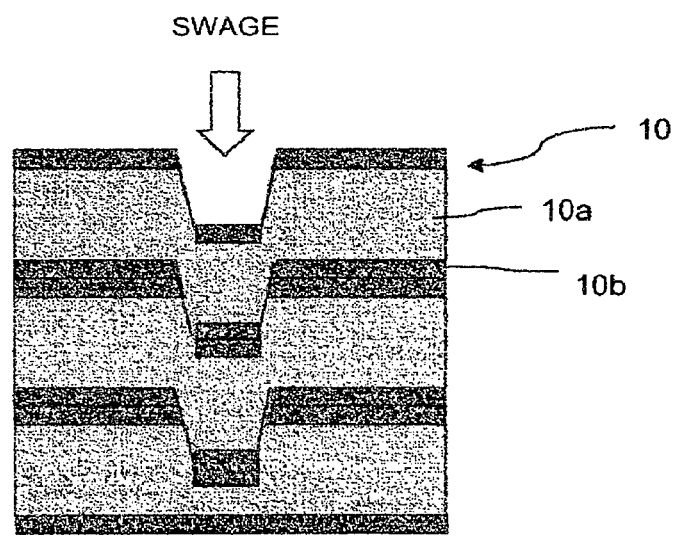
FIG. 7 is a view illustrating a state of the stacked magnetic steel sheets being swaged in conventional practice.

In conventional practice, the stacked magnetic steel sheets 10 are fixed to one another by swaging etc. In this case, as shown in FIG. 7, a swaged portion of the magnetic steel sheet 10 is pressed into the adjacent magnetic steel sheet 10. Thus, the steel material 10a of the magnetic steel sheet 10 comes in contact with the steel material 10a of the adjacent magnetic steel sheet 10, and a magnetic flux flows through the contact portion. Also in the case of welding, the insulation films are removed and the magnetic steel sheets become conductively continuous with each other. Thus, the conventional methods have a disadvantage in that the iron loss in the rotor core 20 increases. This embodiment can prevent an increase in iron loss by keeping the adjacent magnetic steel sheets 10 insulated from each other.

FIG. 8A to FIG. 8F show the configuration and the operation of a press machine used in the seventh process. In this example, a lower body (die side) 40 is fixed, while an upper body (punch side) 42 moves upward and downward relative to the lower body 40. The lower body 40 has a cutting blade 44 at an upper end. The cutting blade 44 has an annular shape, and an outer periphery of the cutting blade 44 defines the outer periphery of the magnetic steel sheet 10. The upper body 42 has a cutting blade 46 of which an inner periphery is located at a position roughly corresponding to (slightly on the outer side of) the cutting blade 44 of the lower body 40, and which punches the outer periphery of the magnetic steel sheet 10 from the material 30 in conjunction with the cutting blade 44 of the lower body 40.

A pad 48 is provided on the inner side of the cutting blade 46, and a spring 50 is disposed above the pad 48 and urges the pad 48 downward. The rotating shaft 22 held by a chuck 52 from above is located on the inner side of the pad 48. The chuck 52 has a thread cut in an outer periphery, and is screwed on the upper body 42. As the chuck 52 is rotated by a rotating machine 54, the chuck 52 is moved upward and downward relative to the upper body 42.

Figure 8A:
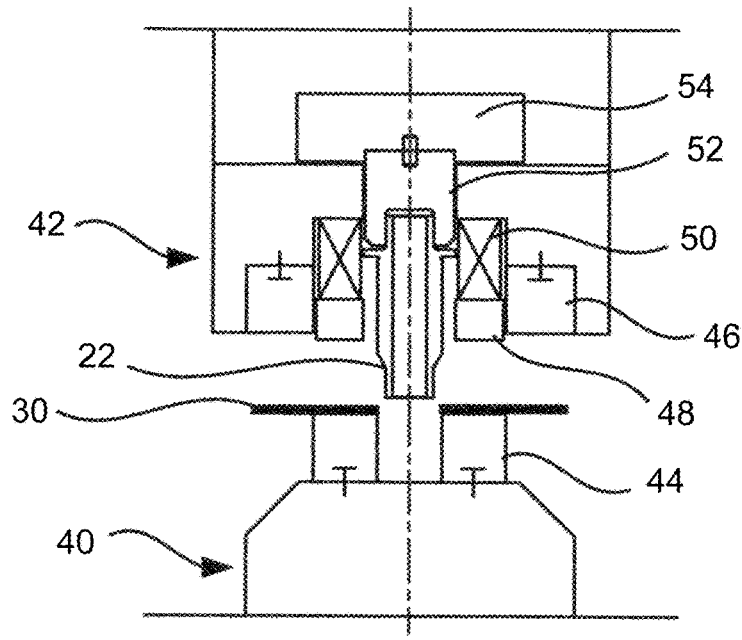
FIG. 8A is a view illustrating the configuration and one process of the operation of a press machine that performs punching of an outer periphery of the rotor and press-fitting of the shaft member shown in FIG. 5.
Figure 8B:
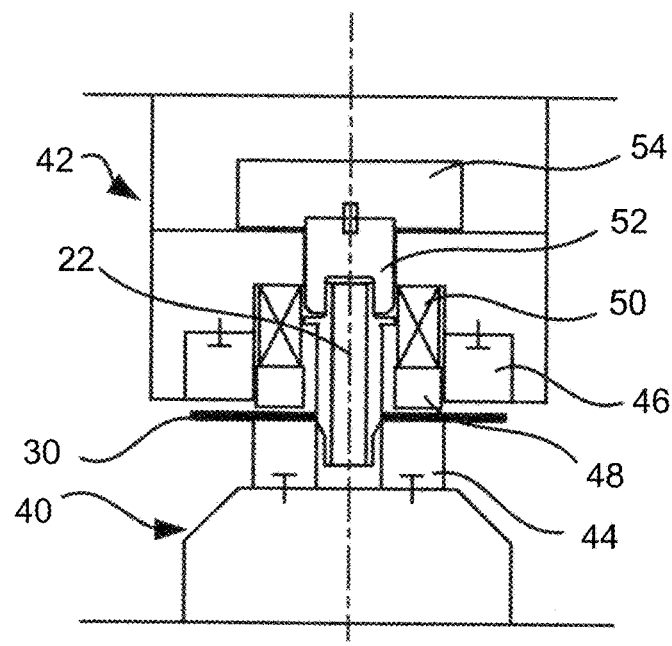
FIG. 8B is a view illustrating the configuration and one process of the operation of the press machine that performs punching of the outer periphery of the rotor and press-fitting of the shaft member shown in FIG. 5.
Figure 8C:
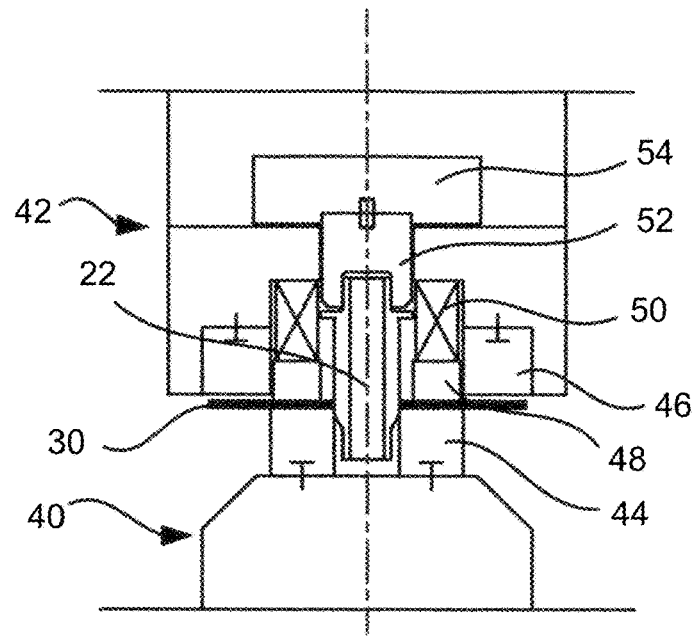
FIG. 8C is a view illustrating the configuration and one process of the operation of the press machine that performs punching of the outer periphery of the rotor and press-fitting of the shaft member shown in FIG. 5.
Figure 8D:
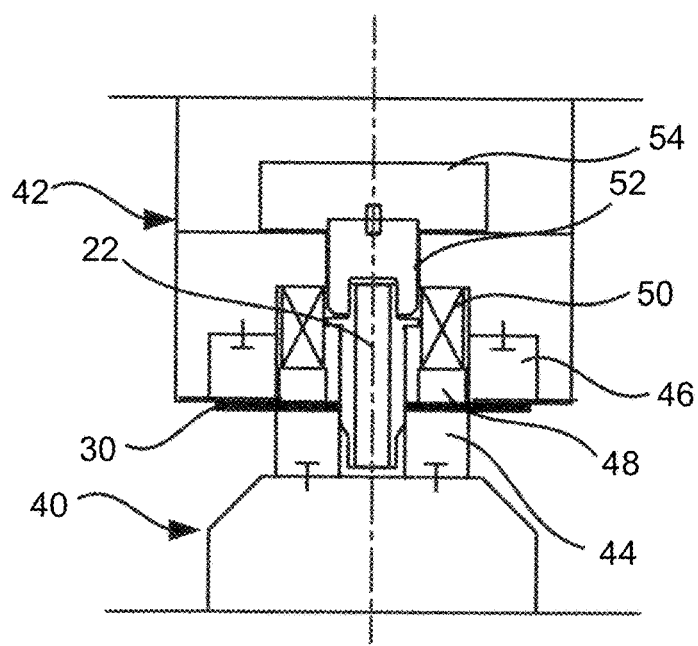
FIG. 8D is a view illustrating the configuration and one process of the operation of the press machine that performs punching of the outer periphery of the rotor and press-fitting of the shaft member shown in FIG. 5.
Figure 8E:
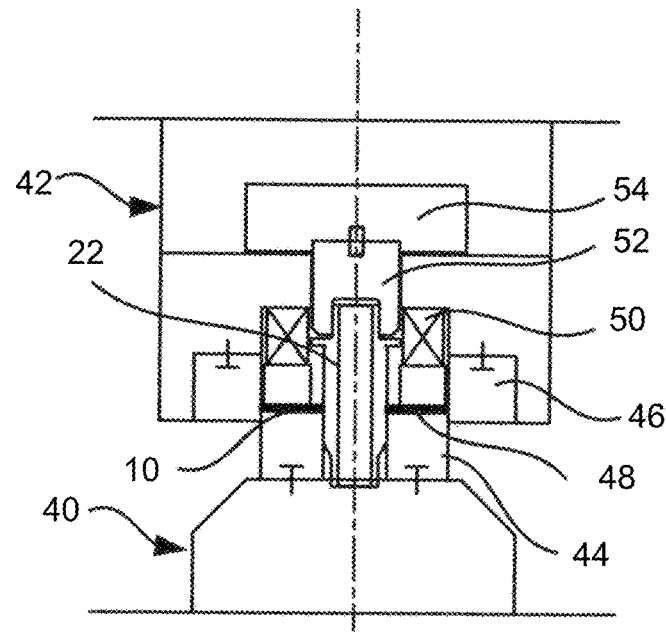
FIG. 8E is a view illustrating the configuration and one process of the operation of the press machine that performs punching of the outer periphery of the rotor and press-fitting of the shaft member shown in FIG. 5.
Figure 8F:
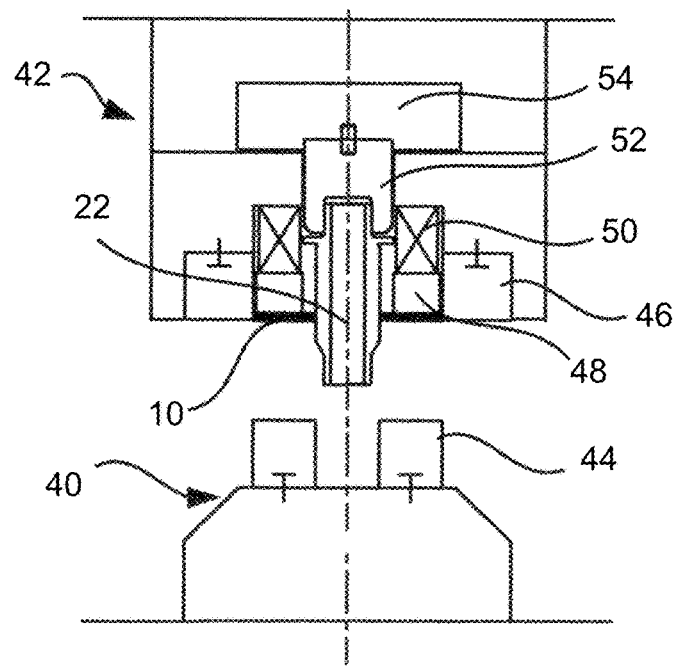
FIG. 8F is a view illustrating the configuration and one process of the operation of the press machine that performs punching of the outer periphery of the rotor and press-fitting of the shaft member shown in FIG. 5.

The press machine operates as follows to perform the seventh process. While the material 30 is shown as being short in FIG. 8, the material 30 has actually a long sheet shape and is positioned by being moved in the left-right direction in FIG. 8. When punching of one magnetic steel sheet 10 is completed, the material 30 is moved in an amount corresponding to one magnetic steel sheet 10, and punching of the outer periphery of the next magnetic steel sheet 10 is performed. (a) The material 30 having undergone up to the sixth process is located on the cutting blade 44 of the lower body 40. At this point, the shaft hole 18 is located roughly at the center of the rotating shaft 22 (FIG. 8A). (b) The upper body 42 starts to move downward. Thus, the rotating shaft 22 fixed to the chuck 52 is inserted from a lower end thereof into the shaft hole 18, and starts to be press-fitted. As a result, the center of the shaft hole 18 is located at the center of the rotating shaft 22 (FIG. 8B). (c) The upper body 42 moves further downward, and the material 30 is pressed and fixed by the pad 48 (FIG. 8C). (d) The upper body 42 moves further downward, so that the spring 50 is compressed and the cutting blade 46 is brought into contact with the material 30, and thus punching is started. This punching is performed by the cutting blades 44, 46 that have been positioned using the center of the rotating shaft 22 as reference (FIG. 8D). (e) The material 30 is cut by the cutting blades 44, 46 and the outer periphery of the annular magnetic steel sheet 10 is formed, and the upper body 42 reaches a lower limit point (FIG. 8E). (f) The upper body 42 moves upward and reaches an upper limit point (FIG. 8F). The rotating shaft 22 has been press-fitted in the magnetic steel sheet 10, and the magnetic steel sheet 10 has been fixed to the rotating shaft 22.

Then, the rotating shaft 22 is moved downward by the rotating machine 54 in an amount corresponding to the thickness of one magnetic steel sheet 10, and the press machine returns to (a). In the process shown in FIG. 8A of the second time, the magnetic steel sheet 10 punched in the first time has been fixed to the rotating shaft 22, but the rotating shaft 22 has been moved downward in an amount corresponding to the thickness of the magnetic steel sheet 10. In the process shown in FIG. 8B, therefore, the magnetic steel sheet 10 of the first time is moved upward in an amount corresponding to the thickness thereof, and the processes shown in FIG. 8C to FIG. 8F on the second material 30 are performed in the same manner as in the first time. When this operation is repeated for a required number of magnetic steel sheets 10, the rotor core 20 having the required number of magnetic steel sheets 10 stacked around the rotating shaft 22 is obtained.

In particular, since the outer periphery of the magnetic steel sheet 10 is punched using the rotating shaft 22 that is a component of the rotor core 20 as reference, any elongation of the material 30 under the pressure of the pad etc. has little impact. Even when the long material 30 meanders, the center of the rotating shaft 22 and the center of the shaft hole 18 are matched in the process of inserting the rotating shaft 22 into the shaft hole 18, and thus the outer periphery of the magnetic steel sheet 10 can be accurately formed.

In particular, rotational stacking of stacking the magnetic steel sheets 10 while reversing the direction of the magnetic steel sheets 10 at a predetermined frequency is practiced in order to reduce the difference in characteristics among the magnetic steel sheets 10. When the various holes are formed in the material using the pilot holes 32 outside the magnetic steel sheet 10 as reference as in conventional practice, the positions of the various holes relative to the magnetic steel sheet 10 shift in one direction. Rotationally stacking such magnetic steel sheets has a disadvantage in that the holes extending in the axial direction shift in the opposite direction each time the direction of the magnetic steel sheet is reversed, which makes the surfaces of the holes extending in the axial direction uneven. This embodiment can also solve such a problem accompanying rotational stacking.

Figure 9A:
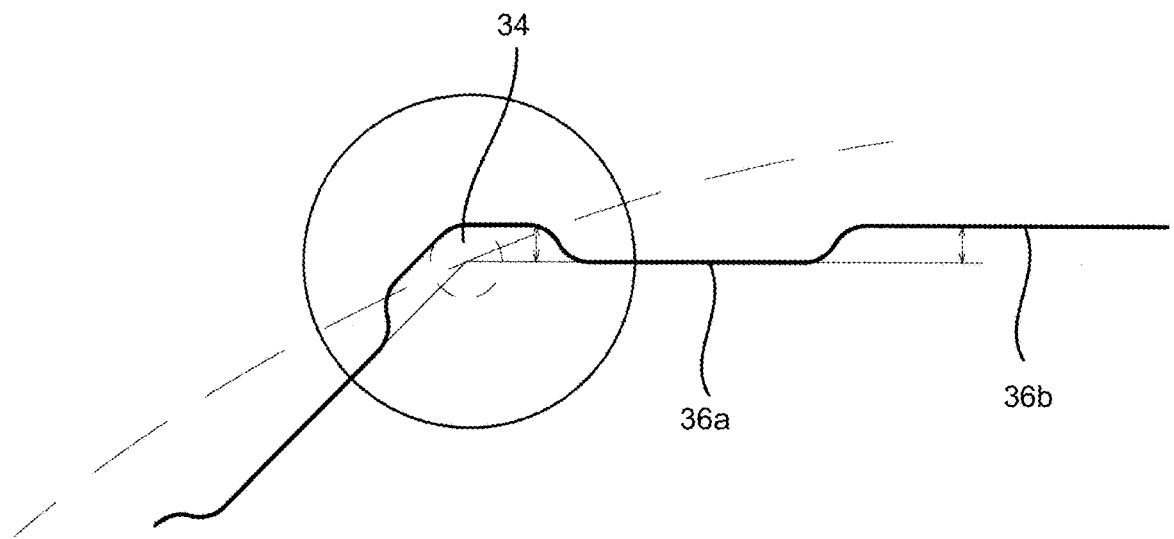
FIG. 9A is an enlarged view showing one side of an octagonal shaft hole into which a rotating shaft is press-fitted.
Figure 9B:
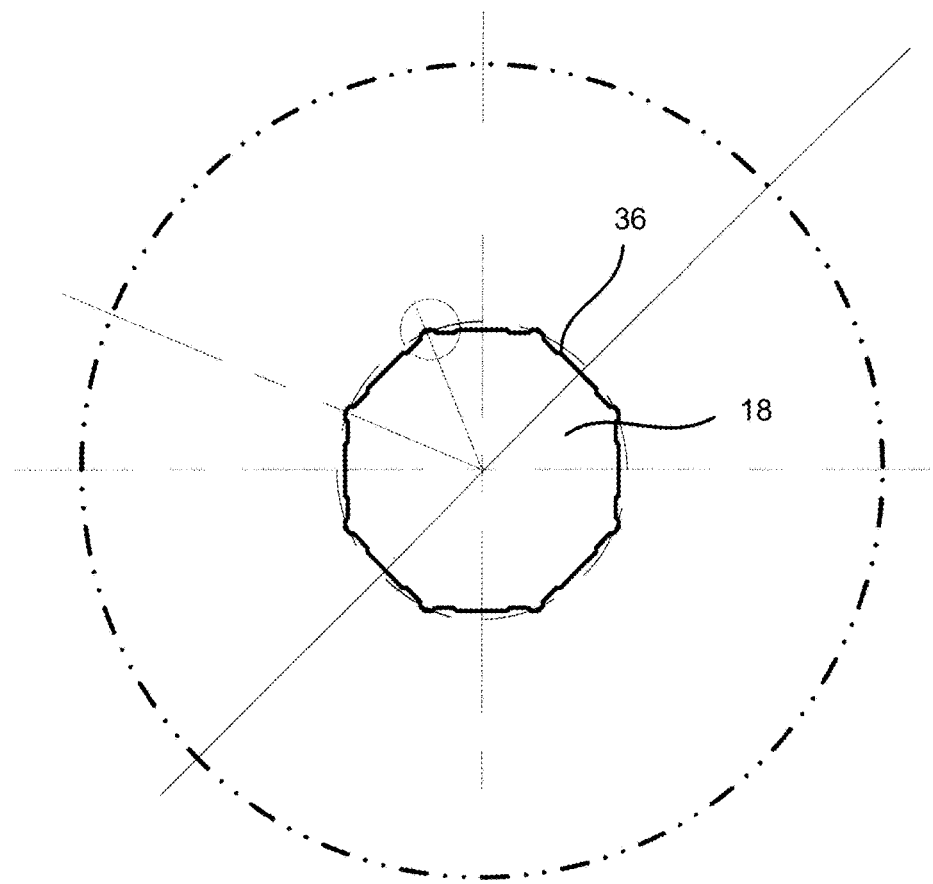
FIG. 9B is a view showing the octagonal shaft hole into which the rotating shaft is press-fitted.

FIG. 9A and FIG. 9B show the configuration of the shaft hole 18 before the rotating shaft 22 is press-fitted therein. As shown, the shaft hole 18 has an octagonal shape as a whole. In this example, the rotating shaft 22 is also an octagonal prism.

As shown in FIG. 9A, a nook 34 spreading outward beyond the outer periphery of the rotating shaft 22 is formed at each corner of the shaft hole 18. In each side 36, protrusions 36a protruding inward and a recess 36b recessed outward are formed. The protrusions 36a are formed at parts closer to both corners, and an intermediate part between the two protrusions 36a forms the recess 36b. The position of the recess 36b is substantially the same as the position of the outer periphery of the rotating shaft 22. Thus, the shaft hole 18 can easily deform such that, when the rotating shaft 22 is press-fitted into the shaft hole 18, the outside diameter of the shaft hole 18 matches the outside diameter of the rotating shaft 22, as the material 30 spreads outward as a whole and the material at the protrusions 36a is accommodated in the nooks 34 and the recesses 36b. Therefore, when the rotating shaft 22 is press-fitted, the entire shaft hole 18 comes in contact with the outer periphery of the rotating shaft 22 and is fixed to the rotating shaft 22 by stress.

According to this embodiment, the outer periphery of the magnetic steel sheet 10 defining the outside diameter of the rotor core 20 is punched using the center of rotation of the rotor core 20 as reference. In particular, the outer periphery is punched after the rotating shaft 22 is fastened to the magnetic steel sheet 10. Thus, even when the material 30 meanders or becomes elongated in a conveying direction due to large force of the pad, the magnetic steel sheet 10 excellent in dimensional accuracy can be obtained.

Accordingly, the magnetic steel sheet 10 as a single component and the rotor core 20 that is an assembly of the magnetic steel sheets 10 are excellent in dimensional accuracy. Therefore, building a rotating electrical machine using these components can reduce the air gap between the rotor and the stator, and thus a high-torque rotating electrical machine can be built. Since the magnetic steel sheets 10 and the rotating shaft 22 are fixed to each other by press-fitting, the need for swaging and welding that cause an iron loss can be eliminated.

The above embodiment assumes punching by a progressive press device for productivity's sake. However, the press device may instead be a tandem press or a transfer press. That is, the processing method is not limited, as long as the dimensional accuracy of the outside diameter can be improved by processing the radially outer part of the rotor core using the rotating shaft as reference. Thus, the dimensional accuracy can be improved by punching the radially outer part of the magnetic steel sheet after fastening the rotating shaft to the material of the magnetic steel sheet. A plurality of magnetic steel sheets may be processed at a time, instead of one sheet at a time.

Other component than the rotating shaft, for example, a magnet may be used as reference for processing. Although using the rotating shaft as reference is most effective in improving the dimensional accuracy of the outside diameter, a magnetic hole may instead be used as a reference component.

The method of fastening together the rotating shaft and the magnetic steel sheet is not limited to press-fitting. The rotating shaft and the magnetic steel sheet may instead be fastened together by using friction or ultrasonic vibration, by welding such as laser welding, or by using an adhesive.

In a second embodiment, a stator core is adopted as a core of a rotating electrical machine, and magnetic steel sheets are processed and stacked to form the stator core as a stack.

Figure 10:
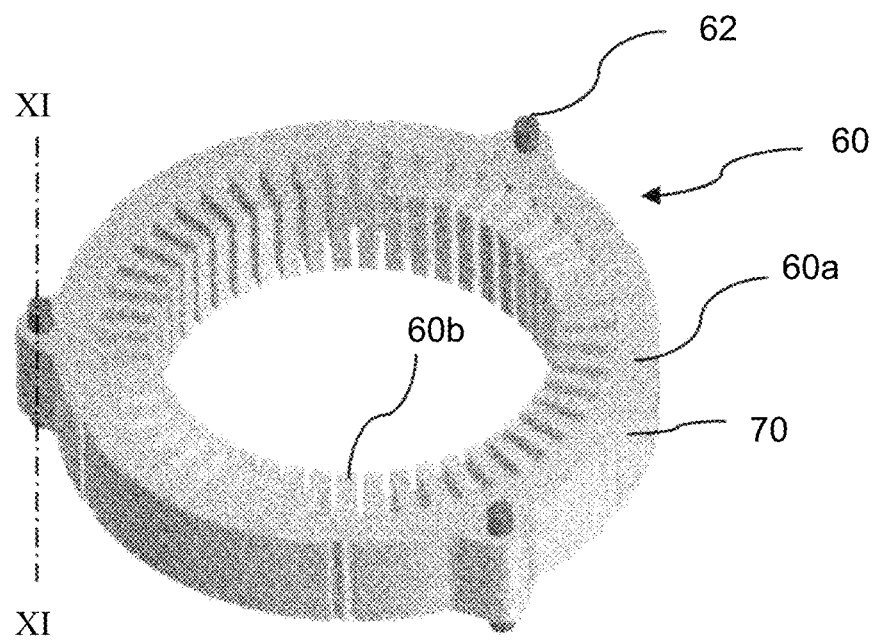
FIG. 10 is a perspective view of a stator core in a second embodiment of the present disclosure.

FIG. 10 shows a perspective view of a stator core 60 according to this embodiment. The stator core 60 has an annular yoke 60a on the outer peripheral side, and a plurality of teeth 60b extending radially inward from the yoke 60a and disposed at regular intervals in a circumferential direction. A space between adjacent teeth 60b forms a slot, and a coil is wound around each tooth using this slot to form a stator.

The stator core 60 is formed by stacking a large number of magnetic steel sheets 70. Portions of the yoke 60a bulge outward, and a pipe-shaped sleeve 62 extending in an axial direction is inserted as a shaft member into each bulging portion to fix the magnetic steel sheets 70.

Figure 11:
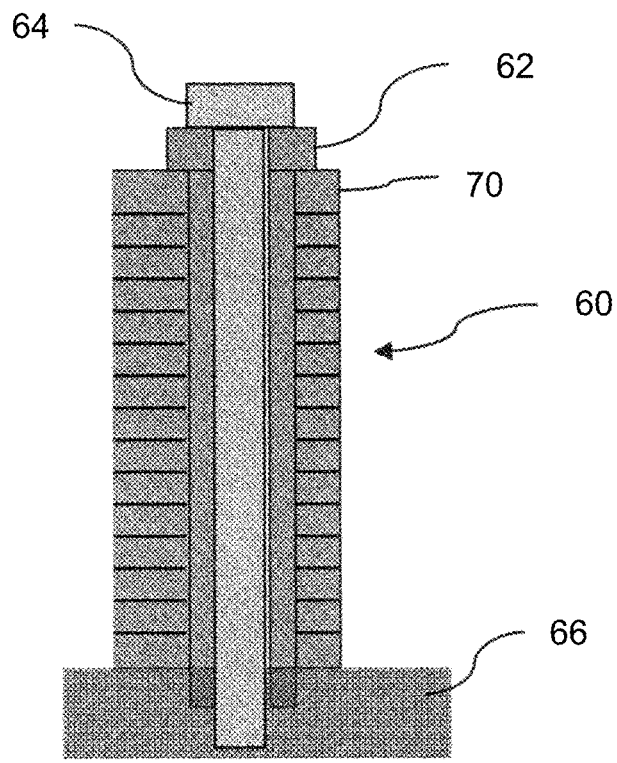
FIG. 11 is a sectional view showing the stator core fixed to a sleeve in FIG. 10.

FIG. 11 shows a section (section XI-XI) along a plane in the axial direction at a position at which the sleeve 62 is disposed (a plane in the axial direction passing through the center).

The sleeve 62 has a pipe shape and extends through the stacked magnetic steel sheets, and a lower end of the sleeve 62 is supported by being inserted into a motor case 66. A bolt 64 is passed through the sleeve 62, and a head of the bolt 64 presses a head of the sleeve from above, and a lower end of the bolt 64 is screwed on the motor case 66, so that the stacked magnetic steel sheets 70 are fixed to the motor case 66 through the sleeve 62.

FIG. 11 shows only a part of the yoke 60a at which the sleeve 62 is disposed. In reality, the yoke 60a extends further inward, and the teeth 60b are located on the inner side of the yoke 60a.

Figure 12:
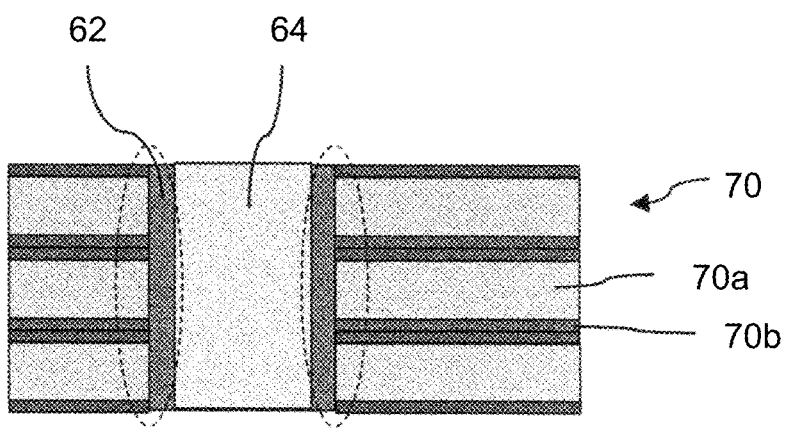
FIG. 12 is a sectional view of the stacked stator core.

FIG. 12 shows a state where the magnetic steel sheets 70 are stacked. Each magnetic steel sheet 70 is composed of a sheet-shaped steel material 70a and an insulation film 70b formed on each side of the steel material 70a. The stacked magnetic steel sheets 70 are insulated from each other, and a vortex magnetic flux is formed in the axial direction. In this embodiment, that is to say, the magnetic steel sheets 70 are fixed to the sleeve 62 as the magnetic steel sheets 70 are press-fitted onto the sleeve 62. Thus, this embodiment does not involve a process of connecting the stacked magnetic steel sheets 70 to one another by swaging, and the magnetic steel sheets 70 stacked in the process of punching the outer periphery are pressed so as to be stacked without clearance. Therefore, an iron loss occurring when the magnetic steel sheets 70 are made conductively continuous with one another by swaging can be prevented.

FIG. 13 schematically shows a manufacturing process of the magnetic steel sheet 70 for the stator core 60. In a first process, the pilot holes 32 are formed in the band-shaped material (band-shaped steel sheet) 30. In a second process, slots 60c are formed using the pilot holes 32 as reference. In a third process, sleeve holes 62a into which the sleeves 62 are to be inserted are formed. In a fourth process, the outer periphery of the magnetic steel sheet 70 is punched, and the magnetic steel sheet 70 is punched from the material 30. Next, in a fifth process, the punched magnetic steel sheet is conveyed, and an inner periphery is punched by a press machine.

FIG. 14 shows punching of the inner periphery and stacking in the fifth process. First, the sleeves 62 are press-fitted into the sleeve holes 62a formed in the magnetic steel sheet 70, and the magnetic steel sheet 70 is fixed at a predetermined position. In this state, the inner periphery is punched. In this case, the inner periphery is processed using the sleeves 62 as reference.

The processing of the inner periphery is sequentially repeated while the magnetic steel sheets 70 are rotationally stacked. When a predetermined number of sheets have been stacked, the stacked magnetic steel sheets 70 are fastened together with the axial bolts, which completes the stator core 60.

FIG. 15A to FIG. 15H show processes of stacking the magnetic steel sheets using the press machine. In the press machine, the lower body (die side) 40 is fixed while the upper body (punch side) 42 moves upward and downward relative to the lower body 40. The lower body 40 has the cutting blade 44 at the upper end. The cutting blade 44 has an annular shape, and an inner periphery of the cutting blade 44 defines the inner periphery of the magnetic steel sheet 70 (the positions of leading ends of the teeth 60b). The upper body 42 has the cutting blade 46 of which an outer periphery is located at a position roughly corresponding to (slightly on the inner side of) the cutting blade 44 of the lower body 40, and which punches the inner periphery of the magnetic steel sheet 70 in conjunction with the cutting blade 44 of the lower body 40.

The pad 48 is provided on the outer side of the cutting blade 46, and the spring 50 is disposed above the pad 48 and urges the pad 48 downward. A backup 76 that defines the lower limit point is provided on the outer side of the pad 48.

The lower body 40 has a base body 78. A spline 74 is fixed under the cutting blade 44, and the cutting blade 44 and the spline 74 are connected to the base body 78 so as to be able to slide upward and downward. The base body 78 has a cylindrical hollow at a central part, and the cutting blade 44 and the spline 74 are housed in this hollow. A rotating body 72 is disposed on the inner side of the spline 74 and extends downward through the base body 78. The rotating body 72 has a thread formed in an outer periphery, and this thread engages with a thread in an inner periphery of the spline 74. Thus, as the rotating body 72 rotates, the spline 74 and the cutting blade 44 moves upward and downward.

The press machine operates as follows to stack the magnetic steel sheets 70 and form the stator core 60. In FIG. 15A to FIG. 15H, it is assumed that a relatively small provisional hole is formed at a central part of the magnetic steel sheet 70 that is a processing target, but this provisional hole need not be formed. In FIG. 15A to FIG. 15H, only the right half is shown.

Figure 15A:
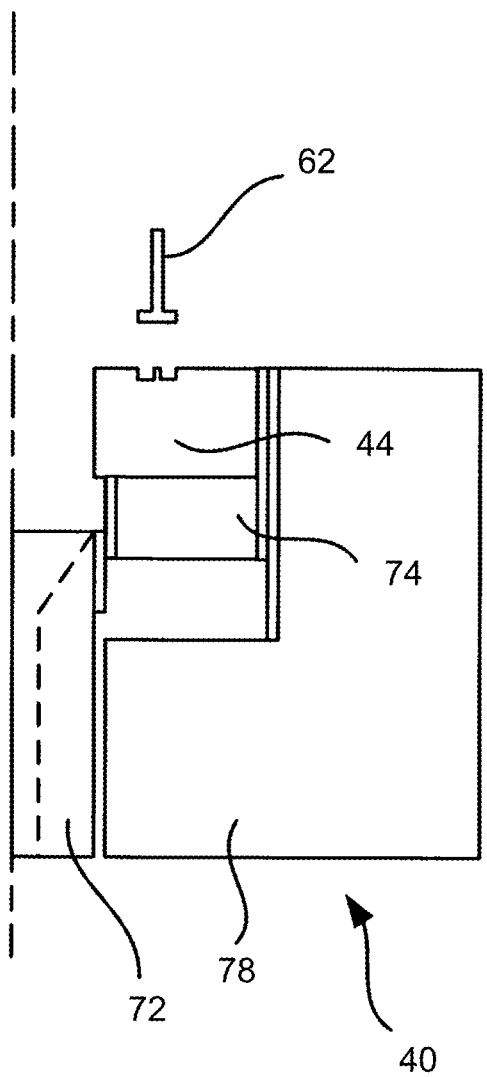
FIG. 15A is a view illustrating one process of stacking processes of the stator core using a press machine in the second embodiment.
Figure 15B:
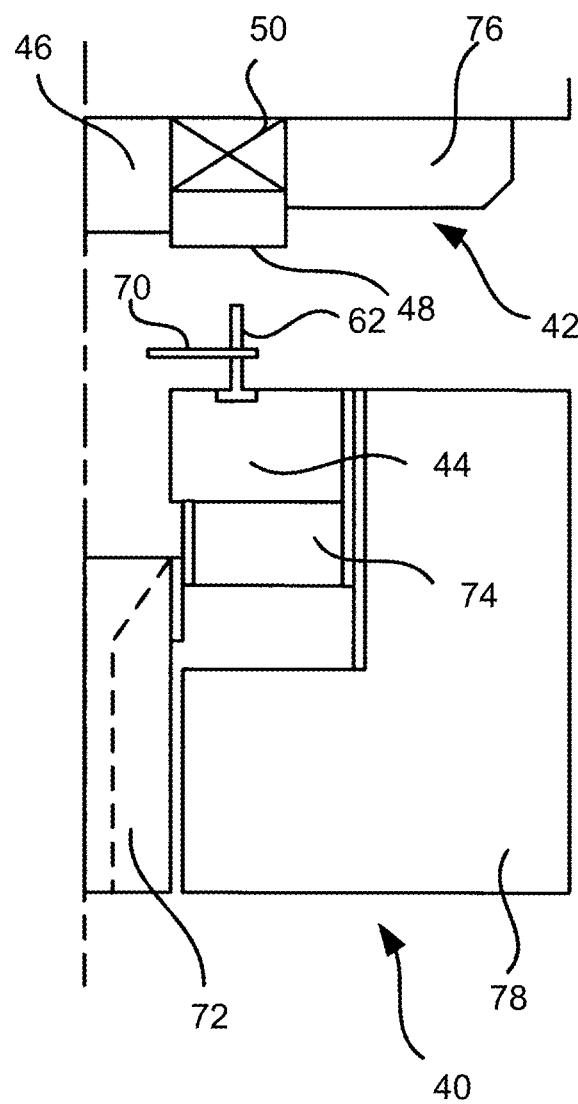
FIG. 15B is a view illustrating one process of the stacking processes of the stator core using the press machine in the second embodiment.

First, the head of the sleeve 62 is supported on a retaining portion (recess) in an upper surface of the cutting blade 44. Normally, the sleeve 62 is carried in by a robot (FIG. 15A). Next, the sleeve 62 is inserted into the sleeve hole 62a of the magnetic steel sheet 70 (FIG. 15B).

Figure 15C:
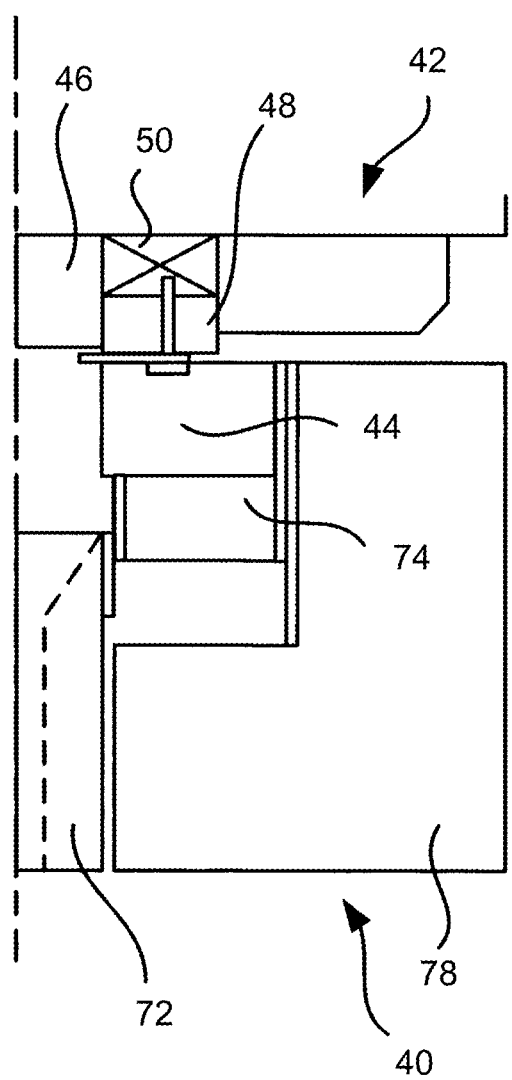
FIG. 15C is a view illustrating one process of the stacking processes of the stator core using the press machine in the second embodiment.

Next, the upper body 42 is moved downward, and the pad 48 is pressed from above against the magnetic steel sheet 70 supported on the upper surface of the cutting blade 44 (FIG. 15C). Thus, the sleeve 62 is press-fitted into the sleeve hole 62a by moving the magnetic steel sheet 70 downward. The upper surface of the cutting blade 44 is a flat surface, and the magnetic steel sheet 70 is supported on the upper surface of the cutting blade 44. Thus, the magnetic steel sheet 70 is pressed by the pad 48 under the urging force of the spring 50.

Figure 15D:
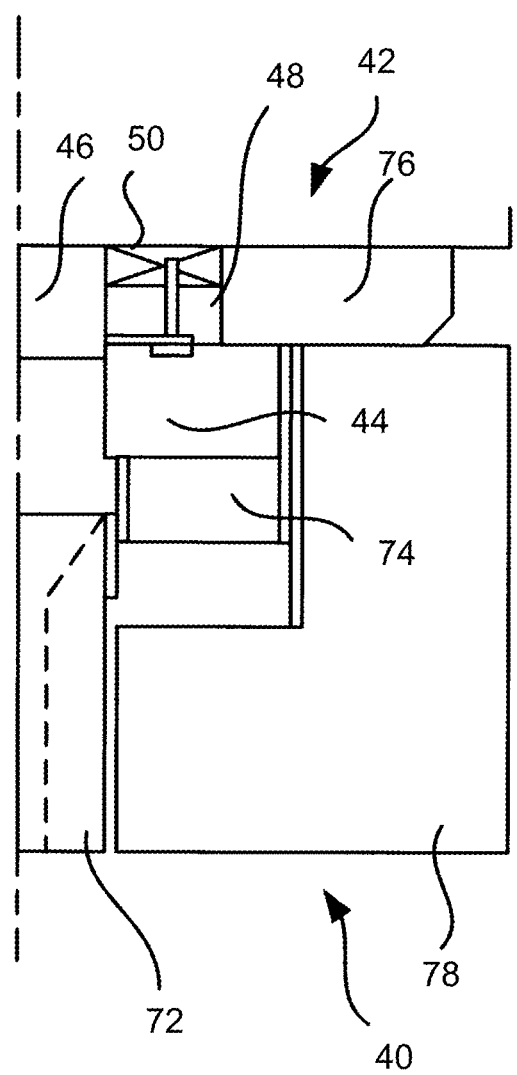
FIG. 15D is a view illustrating one process of the stacking processes of the stator core using the press machine in the second embodiment.

In this state, the upper body 42 is moved further downward, so that the cutting blade 46 is moved downward beyond an upper end of the cutting blade 44 in a state where the magnetic steel sheet 70 is pressed by the pad 48, and thus the inner periphery of the magnetic steel sheet 70 is punched (FIG. 15D).

A chute is formed inside the rotating body 72, and a punched portion is discharged through this chute.

Figure 15E:
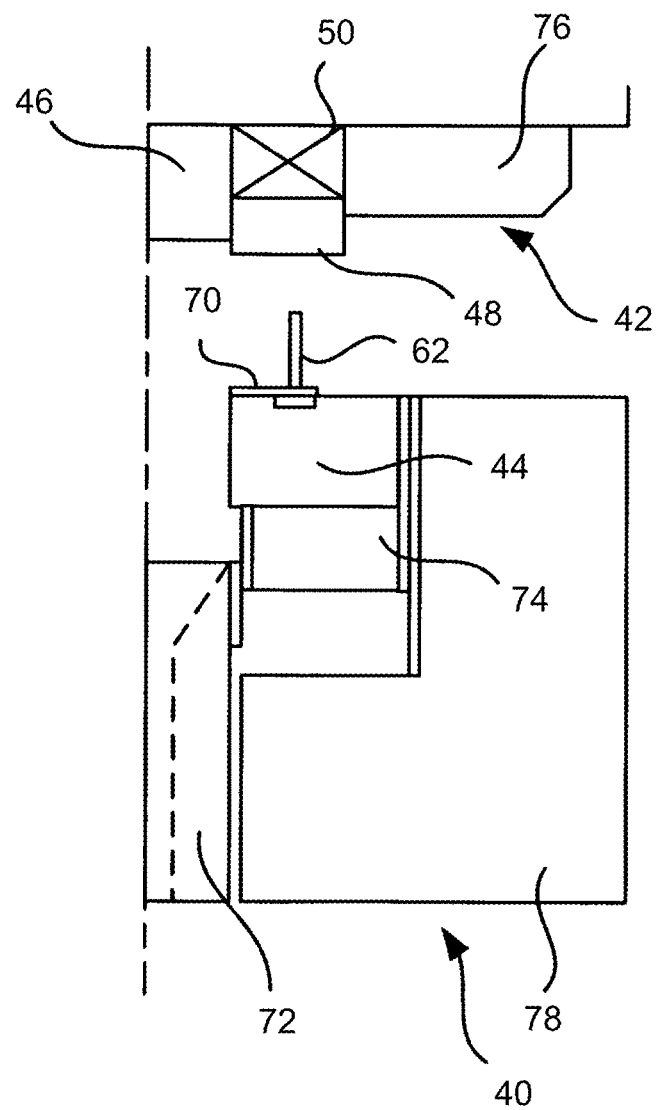
FIG. 15E is a view illustrating one process of the stacking processes of the stator core using the press machine in the second embodiment.

Then, the upper body 42 moves upward (FIG. 15E). Thus, the magnetic steel sheet 70 with the inner periphery punched remains on the upper surface of the cutting blade 44.

Figure 15F:
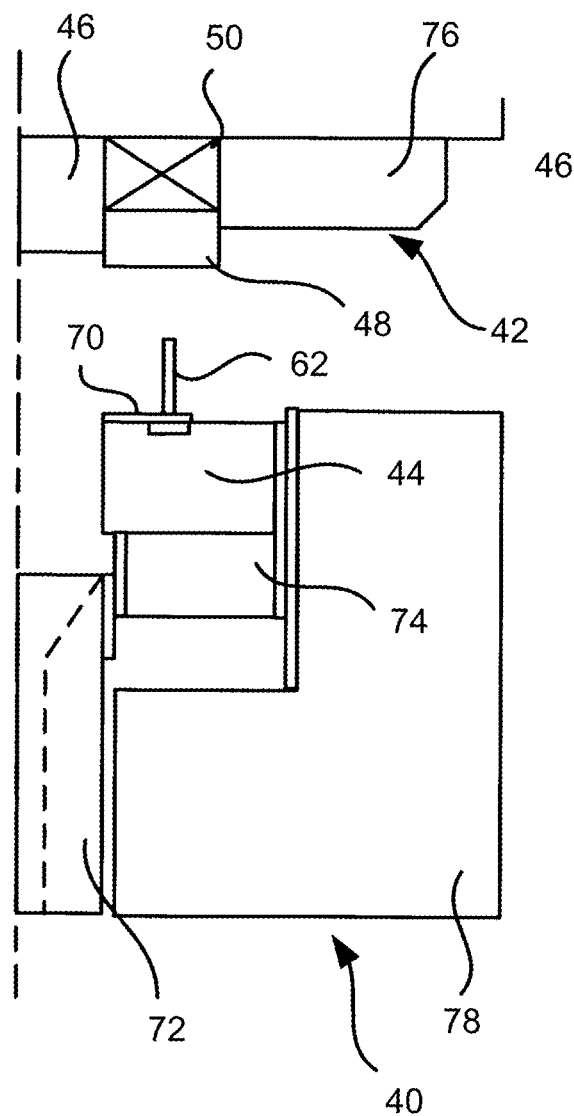
FIG. 15F is a view illustrating one process of the stacking processes of the stator core using the press machine in the second embodiment.
Figure 15G:
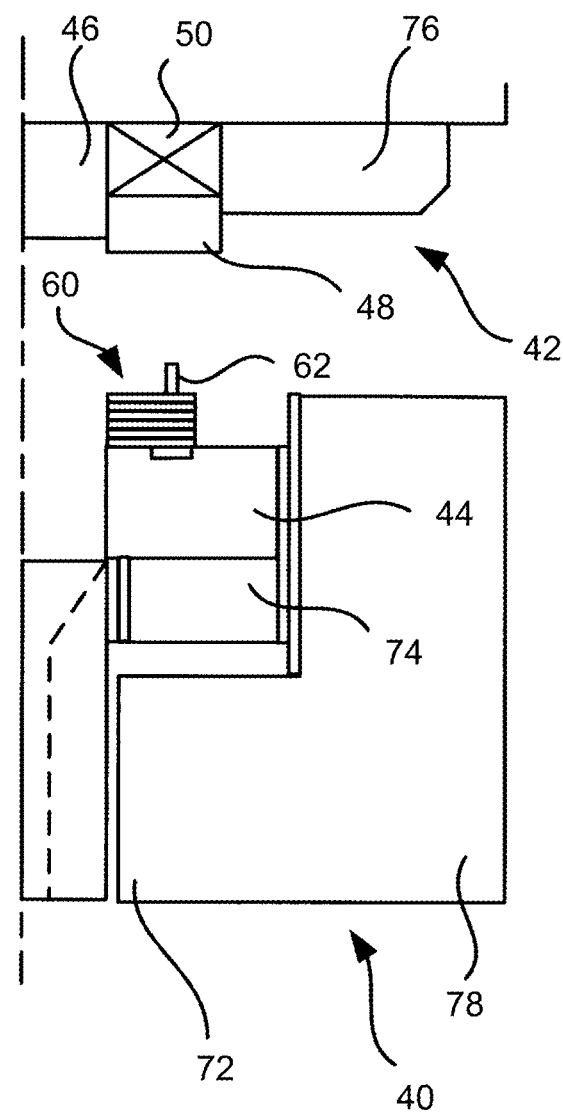
FIG. 15G is a view illustrating one process of the stacking processes of the stator core using the press machine in the second embodiment.
Figure 15H:
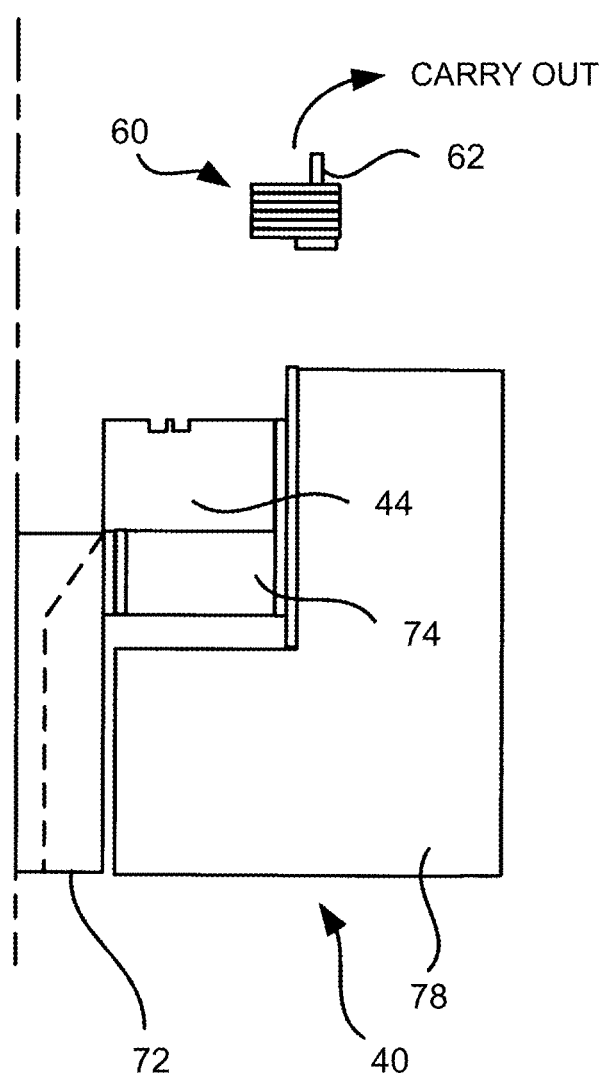
FIG. 15H is a view illustrating one process of the stacking processes of the stator core using the press machine in the second embodiment.

Next, the rotating body 72 is rotated to move the cutting blade 44 downward in an amount corresponding to the thickness of one magnetic steel sheet 70 (FIG. 15F). Thus, the press machine becomes ready to receive the magnetic steel sheet 70 that is the next processing target. Then, the press machine returns to the process in FIG. 15B, and receives the magnetic steel sheet 70 that is the next processing target. In this case, the magnetic steel sheet 70 of which the inner periphery has been processed in the preceding process is located on the upper surface of the cutting blade 44, but the process is otherwise the same. In the process of FIG. 15C, the received magnetic steel sheet 70 is pressed against the magnetic steel sheet 70 having been already processed. Thereafter, punching in the process of FIG. 15D, moving upward in the process of FIG. 15E, and moving the cutting blade 44 downward in the process of FIG. 15F are performed. As these processes are repeated, the stator core 60 in which a predetermined number of magnetic steel sheets 70 with the inner periphery punched are stacked and fixed to the sleeves 62 by press-fitting can be obtained as shown in FIG. 15G. Then, the stator core 60 is carried out and the processing is ended (FIG. 15H).

Thus, in this embodiment, the inner periphery of the magnetic steel sheet 70 is punched using the sleeves 62 that are components of the stator core 60 as reference, in the state where the magnetic steel sheet 70 is press-fitted on the sleeves 62 and fixed thereto. This can reduce the variation in the distance from the sleeve 62 to the inner periphery among the stacked magnetic steel sheets 70. In particular, rotationally stacking the magnetic steel sheets 70 has no adverse effect on punching the inner periphery. Therefore, the dimensional accuracy of the inside diameter of the stator core 60 can be improved.

Since the magnetic steel sheets 70 are stacked by being pressed by the pad 48 and press-fitted onto the sleeves 62, swaging etc. is not required. The adverse effect of swaging can be eliminated.

In the above embodiment, the inner periphery of the magnetic steel sheet is punched with the magnetic steel sheet fixed to the sleeve, with the ease of assembly also taken into account. However, in some cases, stacked magnetic steel sheets are assembled by other means than general-purpose bolts, and thus the component to be press-fitted need not be limited to the sleeve. A solid column may instead be press-fitted into the magnetic steel sheet, and this column may be further press-fitted into the case. The fixing method is not limited to press-fitting, either. Any means may be used as long as the desired positioning accuracy can be achieved.

As in the case of the rotor, various modified examples can be adopted.

The first embodiment can improve the dimensional accuracy of the outer periphery (outside diameter) of the rotor, and the second embodiment can improve the dimensional accuracy of the inner periphery (inside diameter) of the stator. Accordingly, in a rotating electrical machine using these embodiments, the air gap between the rotor and the stator can be reduced.

Figure 16:
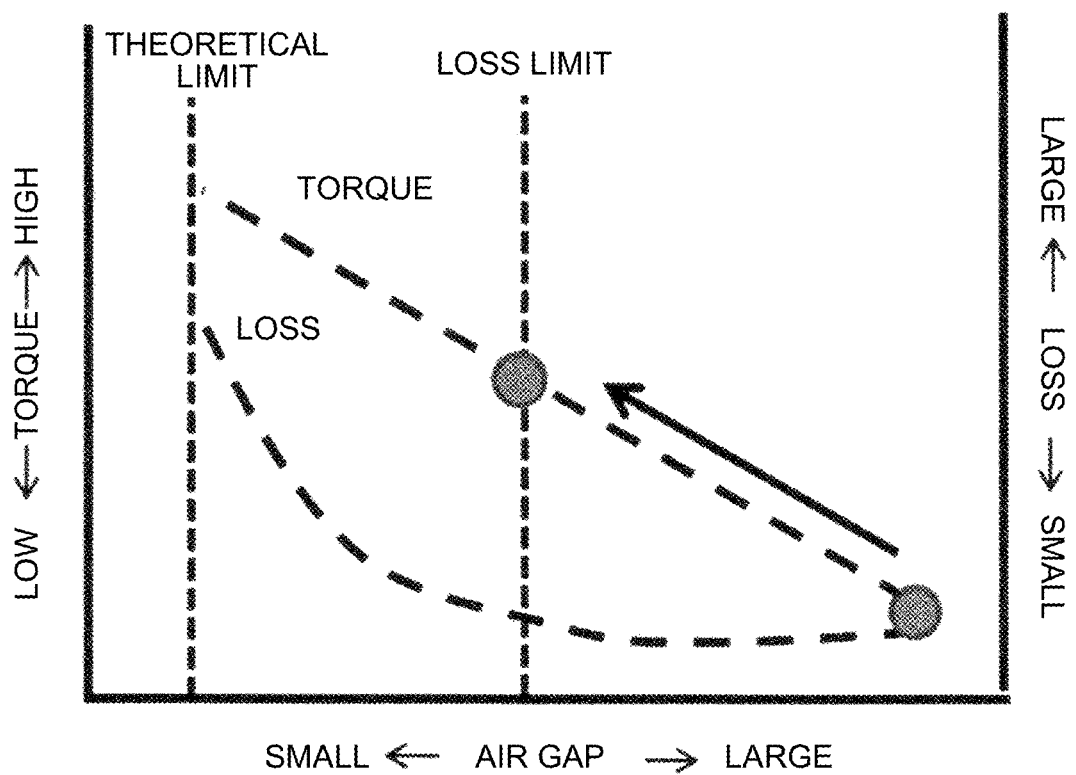
FIG. 16 is a characteristic graph showing relationships between an air gap and each of an output torque and a loss in a rotating electrical machine.

FIG. 16 shows relationships of an air gap to an output torque and a loss in a rotating electrical machine. As shown, as the air gap is reduced, the output torque can be increased and the energy loss can be reduced. Reducing the air gap by 0.1 mm results in a 3 to 5% increase in the output torque. Thus, the above embodiments can significantly improve the performance of the rotating electrical machine.

What is claimed is:

1. A manufacturing method of a core of a rotating electrical machine, the core including a stack of steel sheets and being included in the rotating electrical machine including a shaft member, the shaft member being fixed to the stack of the steel sheets and extending in a stacking direction of the steel sheets, the manufacturing method comprising:
a preparation step of preparing a press device;
a fixing step of fixing a steel sheet to the shaft member held by the press device, by passing the shaft member through a hole previously punched in the steel sheet and extending in the stacking direction; and
after the fixing step, a processing step of performing press-working on the steel sheet to form an inner periphery or an outer periphery of the steel sheet by the press device in a state where the steel sheet is fixed to the shaft member.

2. The manufacturing method of the core of the rotating electrical machine according to claim 1, further comprising
a cutting step of cutting off the steel sheet fixed to the shaft member from a band-shaped steel sheet, wherein:
the preparation step is a step of preparing the press device that sequentially performs press-working on, while conveying, the band-shaped steel sheet by a plurality of press machines of the press device arrayed in a longitudinal direction of the band-shaped steel sheet;
the fixing step is a step of fixing the shaft member and the steel sheet to each other by press-fitting the shaft member held by a final press machine of the plurality of press machines for a final process in the press device into the hole previously punched in the steel sheet and extending in the stacking direction; and
the cutting step is performed by press-working in the final process.

3. The manufacturing method of the core of the rotating electrical machine according to claim 1, wherein:
the fixing step includes a step of fixing a first steel sheet to the shaft member by passing the shaft member through a hole previously punched in the first steel sheet and extending in the stacking direction, and a step of stacking a second steel sheet on the first steel sheet and fixing the second steel sheet to the shaft member to which the first steel sheet is fixed, by passing the shaft member through a hole previously punched in the second steel sheet and extending in the stacking direction, the first steel sheet and the second steel sheet being included among the steel sheets; and
the processing step includes a step of performing press-working on the first steel sheet by the press device in a state where the first steel sheet is fixed to the shaft member, and a step of performing press-working on the second steel sheet by the press device in a state where the second steel sheet is fixed to the shaft member.

4. The manufacturing method of the core of the rotating electrical machine according to claim 3, wherein
the first steel sheet and the second steel sheet are stacked without being fixed to each other.

5. The manufacturing method of the core of the rotating electrical machine according to claim 1, wherein
press-working on the steel sheet is press-working for a rotor core.

6. The manufacturing method of the core of the rotating electrical machine according to claim 5, wherein
the shaft member is a rotor shaft.

7. The manufacturing method of the core of the rotating electrical machine according to claim 1, wherein
press-working on the steel sheet is press-working for a stator core.

8. The manufacturing method of the core of the rotating electrical machine according to claim 7, wherein
the shaft member is a sleeve.

* * * * *